Dec. 18, 1956  H. B. FEHLMANN  2,774,240
SOIL TESTING APPARATUS
Filed April 1, 1952  6 Sheets-Sheet 1

INVENTOR
Hans Beat Fehlmann
BY
Edward F. Connors
ATTORNEY

Dec. 18, 1956  H. B. FEHLMANN  2,774,240
SOIL TESTING APPARATUS
Filed April 1, 1952  6 Sheets-Sheet 2

INVENTOR
Hans Beat Fehlmann
BY Edward T. Connors
ATTORNEY

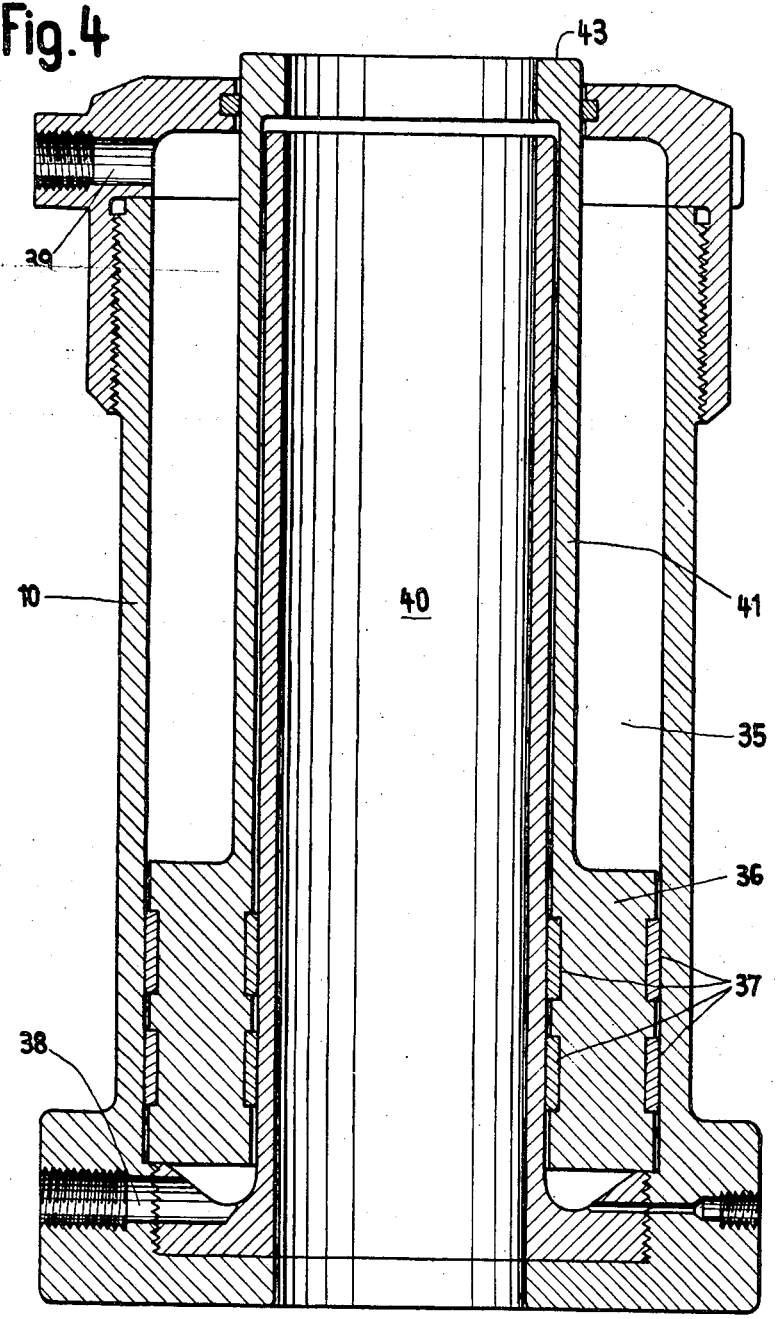

Dec. 18, 1956  H. B. FEHLMANN  2,774,240
SOIL TESTING APPARATUS
Filed April 1, 1952  6 Sheets-Sheet 4
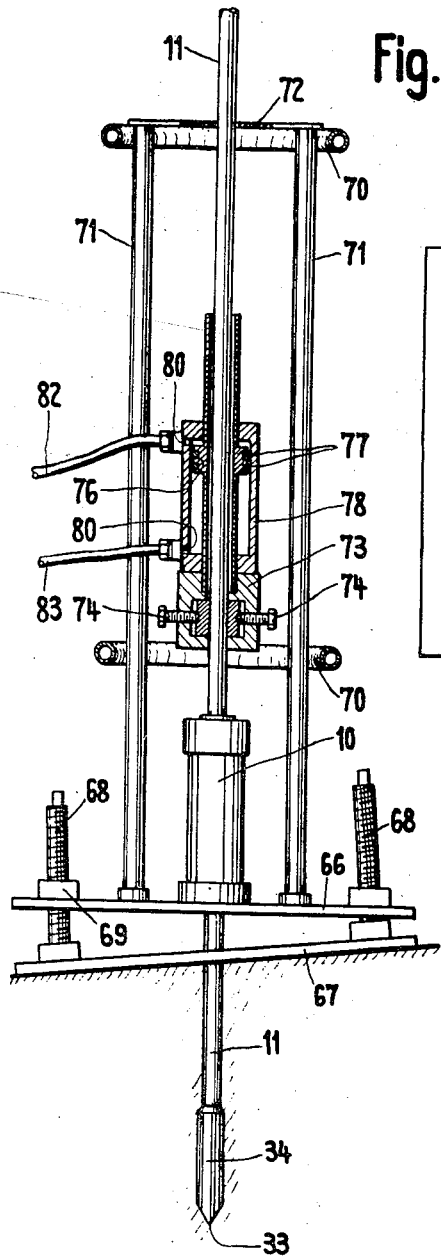
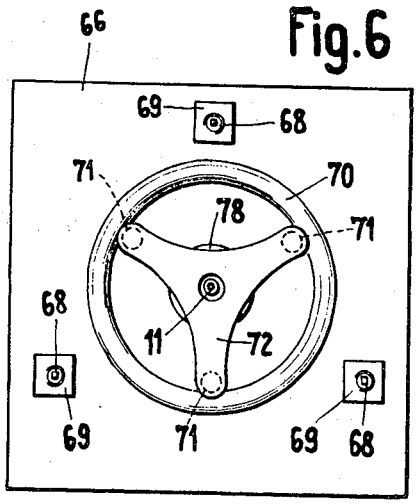
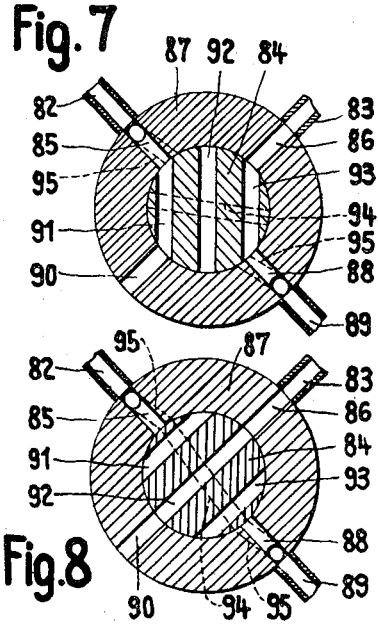
INVENTOR
Hans Beat Fehlmann
BY Edward T. Connors
ATTORNEY Dec. 18, 1956  H. B. FEHLMANN  2,774,240
SOIL TESTING APPARATUS
Filed April 1, 1952   6 Sheets-Sheet 5
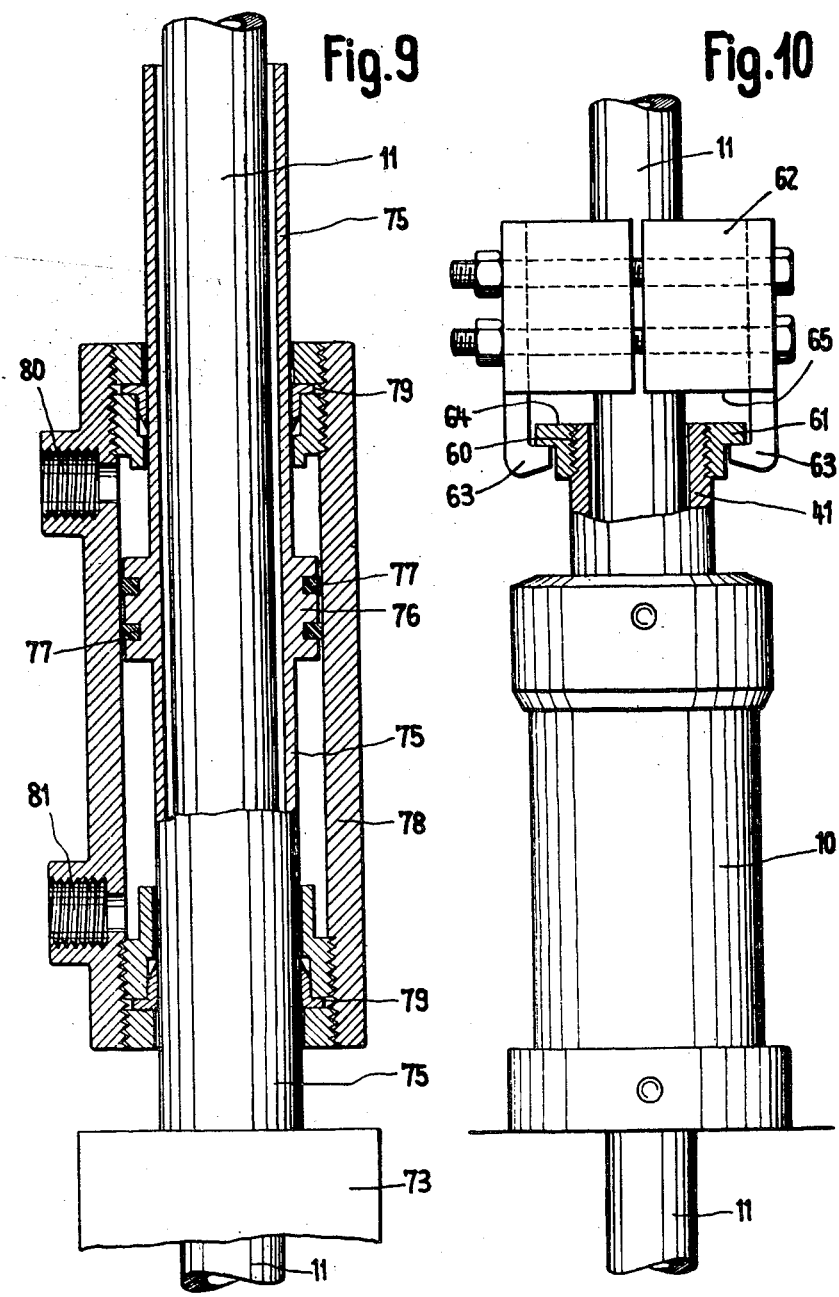
INVENTOR
Hans Beat Fehlmann
BY
Edward T. Connors
ATTORNEY Dec. 18, 1956

H. B. FEHLMANN 2,774,240

SOIL TESTING APPARATUS

Filed April 1, 1952

INVENTOR
Hans Beat Fehlmann
BY
Edward T. Connors
ATTORNEY

United States Patent Office 2,774,240
Patented Dec. 18, 1956

2,774,240

SOIL TESTING APPARATUS

Hans Beat Fehlmann, Bern, Switzerland, assignor to A. G. für Grundwasserbauten, Bern, Switzerland Application April 1, 1952, Serial No. 279,892

Claims priority, application Switzerland April 9, 1951

5 Claims. (Cl. 73—84)

This invention relates to an apparatus for soil testing which may be used for soil research of building sites, for underground construction, or similar purposes in which a probe cylinder is used.

As is well known to those skilled in the art, the resistance to penetration is mainly composed of the skin friction acting onto the probe and of the tip drag or resistance. Hitherto, in ram probing methods, the skin friction has been eliminated by the use of mechanical means such as tubular shells, or the total ramming resistance or drag has been measured, and afterwards the skin friction has been determined by rotating the probe, whereupon the tip drag has been reckoned as the difference between the total ramming drag and the skin friction.

Also probing bars have been statically pressed into the soil and, in order to determine the skin friction, the probing bars have afterwards been moved upwardly from time to time in order in this way to determine the skin friction. In the ram probing method the upward movement of the ram probe has hitherto not been used.

With the above-mentioned well known methods for determining skin friction by moving (rotating or pulling back) the probe, the probe tip had at first been advanced down to the total depth and after each advance the total resistance to penetration had been determined. Only after the advance had been completed, the probe had been withdrawn step by step while measuring the pull back force. With this withdrawal step by step, by the first withdrawal the skin friction of the total depth of penetration of the probe had been obtained, and by the second withdrawal the skin friction of the total depth of penetration reduced by the first partial withdrawal distance has been obtained. This manner of procedure required the calculation of differences for determining the skin friction in the different steps and required withdrawal of the probe by substantially the same distance or step as it had previously been advanced. Similar steps were required in order to determine the skin friction by rotating the probe.

The apparatus according to the invention overcomes these difficulties. It is characterised by means for the determination of the skin friction of a friction cylinder positioned behind the probe tip and having a larger diameter than the stem of the probe. The apparatus is preferably but not exclusively used by moving the friction cylinder after each advance step of the probe for determining the skin friction. This movement may be a rotation. However, it is preferred to simply withdraw the probe by means of a pressure medium, and, to determine the skin friction, to measure the pressure of the medium necessary for withdrawing the probe while taking into consideration the friction of the press.

If at each advance step the probe is advanced by a distance substantially equal to the length of the friction cylinder, the mean value of the skin friction in the region just run through can be measured during withdrawal of the probe by simply reading the pressure of the medium in the press. The lengths of the advance step and of the friction cylinder may be adapted to the nature of the soil to be examined. Reckoning differences is no longer necessary.

The apparatus or device for carrying out the method is characterised in that behind its tip, the probe comprises a friction cylinder having a larger diameter than the probe stem.

Other objects and features will be apparent as the following description proceeds, reference being to the accompanying drawings, wherein Fig. 1 is a side view of the portable device without the ram block and without the releasing mechanism for the latter.

Fig. 4 is an axial section through the hydraulic pulling back cylinder for the ram probe.

Fig. 5 is a diagrammatic and partially sectional view of another retracting mechanism for the device.

Fig. 6 is a plan view corresponding to Fig. 5.

Figs. 7 and 8 are cross sections through the control valve for the ram cylinder of Fig. 5, showing two different positions of the valve plug.

Fig. 9 is an axial section through the ram cylinder shown in Fig. 5.

Fig. 10 shows a detail.

Figure 1:
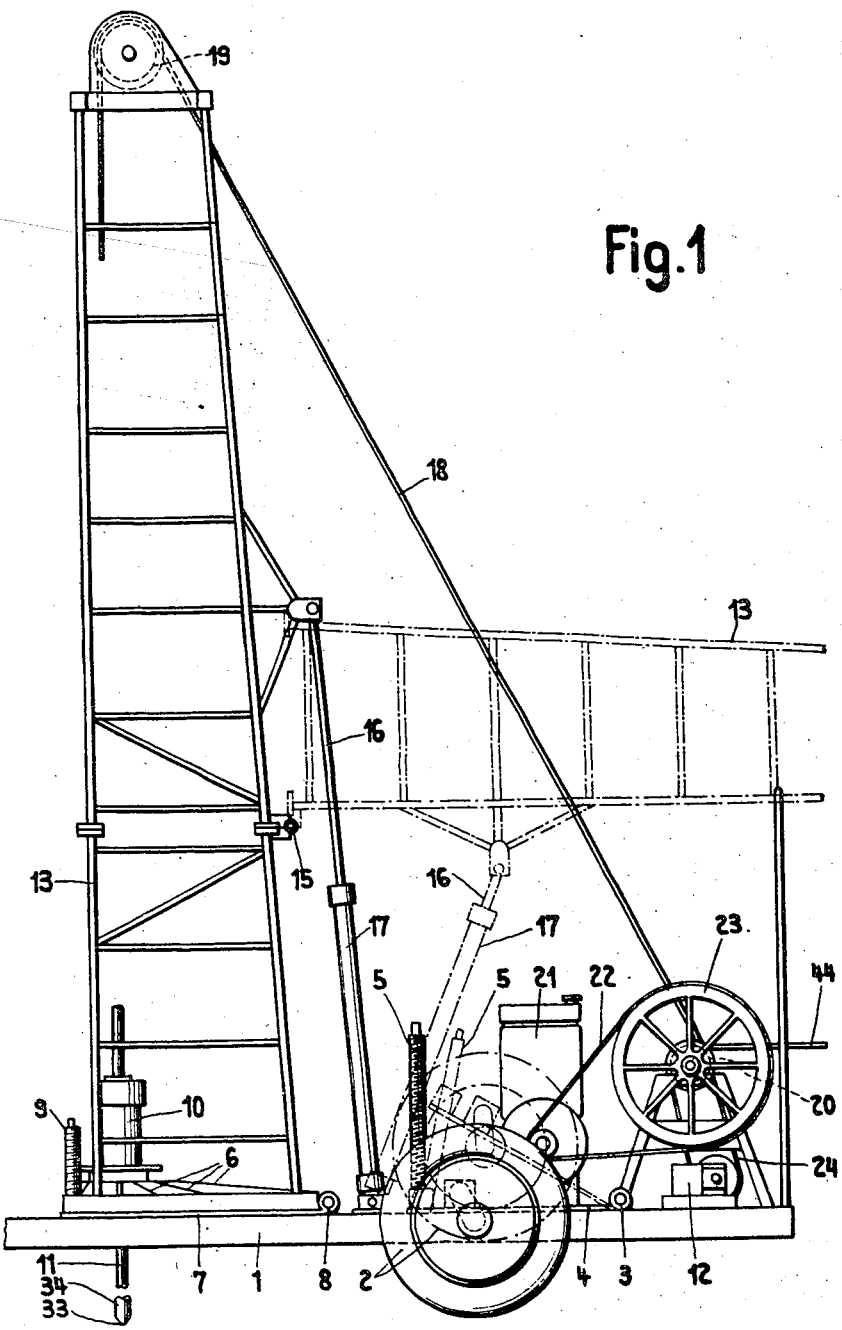
Figure 2:
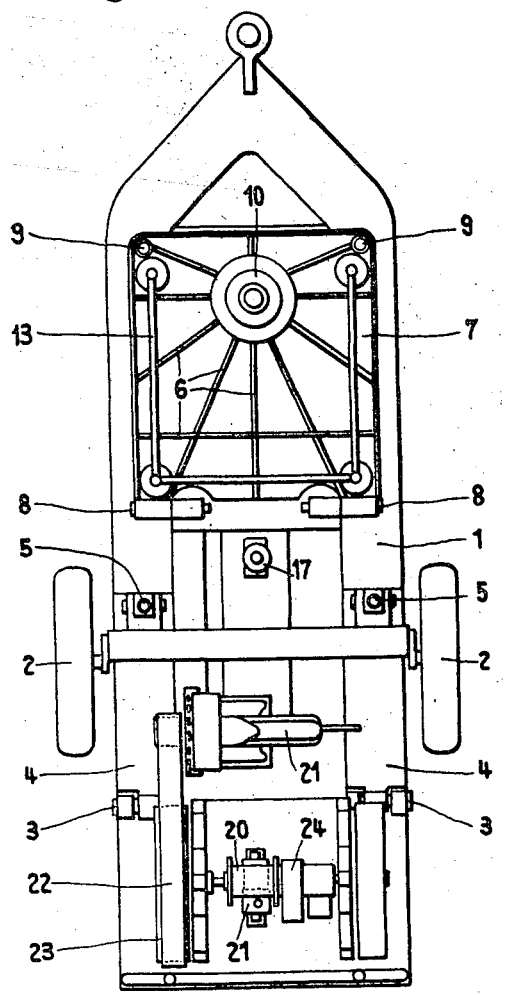
Fig. 2 is a plan view corresponding to Fig. 1.

Referring to the drawings, carriage 1 has raisable and depressable wheels 2 allowing the frame of the carriage to be placed on a base, such as a building site. In their depressed position, the wheels provide transportation for the carriage. The wheel axle is mounted on two arms 4 pivoted on axles 3. Each of these arms can be raised and lowered by means of a threaded spindle 5 articulated to the carriage frame. In Fig. 1, arms 4 and spindles 5 are shown in chain-dotted lines for the raised position of the wheels 2, while they are illustrated in full lines for the lowered position of the wheels. The carriage frame carries a plate 7 stiffened by ribs 6 and swingingly mounted about axles 8. The plate 7 can be lifted and lowered by means of articulated spindles 9, so that the plate 7 can be given a horizontal position even when the carriage frame lies on an inclined base. A pulling back cylinder 10 for a ram probe stem 11 is mounted on the plate 7. This cylinder will be described more in detail later in connection with Fig. 4. The pressure medium or liquid is fed to the cylinder 10 by means of a pump 12 through the intermediary of a distribution system not shown, this system together with the pump 12 being mounted on the carriage. Furthermore, a cantilever 13 for lifting a ram block 14 is arranged on the plate 7. The upper portion of the cantilever 13 is hinged to the lower portion by means of an axle 15 and is displaceable from the working position shown in full lines in Fig. 1 to the chain-dotted transport position by means of a rod 16 linked to the upper cantilever portion. Rod 16 is controllable by a control cylinder 17 connected to the pump 12. The control cylinder 17 is articulated on the carriage frame. A hoisting rope 18 for the ram block 14 is run over a guide roll 19 of the cantilever 13 to a ram shaft 20. Ram shaft 20 is driven by a motor 21 (a gasoline engine, for instance) by means of a belt 22 and a belt pulley 23 fixed to the shaft 20. The drive of the pump 12 delivering the pressure medium is derived from the ram shaft 20 by means of a belt 24.

Instead of raising and lowering the plate 7 and the wheels 2 manually by means of spindles, they may be operated hydraulically with the pump 12.

By the term "pressure fluid" not only liquids are understood in this specification. Also gases, such as air for instance, may be used. A compressor may then be substituted for the pump 12.

Figure 3:
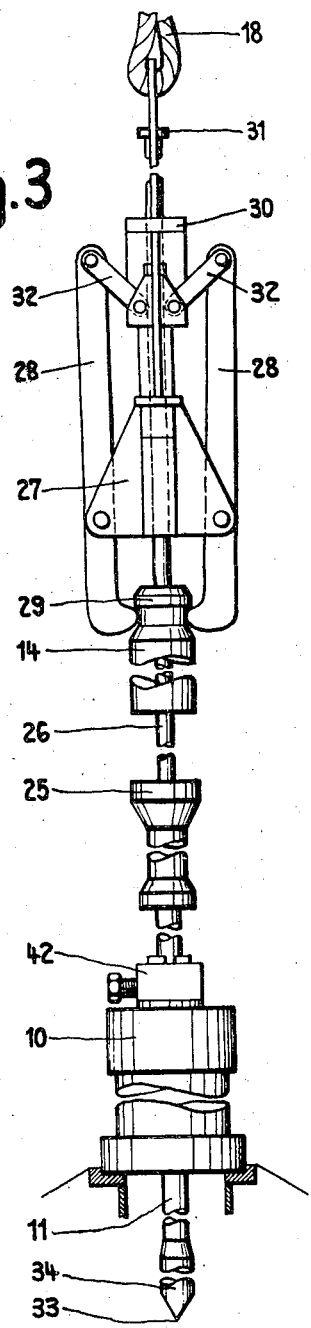
Fig. 3 shows the probe, the hydraulic pulling back cylinder and the ram block with its releasing mechanism.

The ram block 14 which is to cooperate with the ram head 25 connected with the probe stem 11 runs along a guide rod 26. By a releasing mechanism 27 suspended on the rope 18 the block 14 can be lifted and released in its uppermost position. The mechanism 27 is guided along the rod 26 to be moved up and down and comprises two grippers 28 which, in the position of Fig. 3, engage a collar 29 of the ram block 14. The latter is lifted by means of the grippers 28 until a stop 30 strikes against a stop 31 of the rod 26. Then the grippers 28 are swung by a means not shown and with the aid of links 32 in such a way that they disengage the ram block 14 and allow it to drop and thereby to strike against the ram head 25. Since both the ram head 25 and the stop 31 are rigidly connected with the rod 26, the drop height of the ram block 14 remains the same for all subsequent drops.

Immediately after a tip 33, the probe stem 11 has a friction or probe cylinder 34 whose diameter is larger than that of the probe stem lying behind the cylinder. Under certain conditions it may not be suitable to provide the friction cylinder immediately behind the tip but at a distance from the tip so that also the stem portion between the tip and the cylinder is of smaller diameter than the friction cylinder 34.

The cylinder 10 has an annular working space 35 in which an annular piston 36 runs. Piston 36 is sealed against the cylinder walls by packings 37. Control ports 38 and 39 serve the inlet and outlet of the pressure fluid delivered by the pump 12 to and from the working space 35. The probe stem 11 freely reciprocates in a passage 40 surrounded by the working space 35. The piston 36 has a cylindrical, tubular extension 41 which, in the lowermost position of the piston 36, slightly projects beyond the upper end of the cylinder 10. A coupling 42 can alternately be rigidly connected with and loosened from the probe stem 11. Coupling 42 rests on an upper end face 43 of the tube 41 of the piston 36 and, when rigidly connected with the probe stem 11, it is taken along by the piston 36 on an upward stroke of the latter.

The probe method can, for instance be carried out by means of the above-described device as follows:

After having brought the carriage 1 to the working place, the wheels 2 are raised and, if necessary, the plate 7 is swung by means of the spindles 9 and the cantilever 13 is moved into working position by means of the control cylinder 17. Afterwards, the probe stem 11 is led through the passage member 40 of the cylinder 10 and put on the soil to be tested. Now the ram block 14 resting on the ram head 25 is lifted by means of the device 27 in that the worker pulls on the free end 44 of the rope 18 whereupon the ram shaft 20 winds up the rope 18. Then, after the grippers 28 having disengaged the collar 29 as described above, the first blow is given to the head 25 by the ram block 14. The blows are repeated as many times as necessary to advance the probe into the soil at each advance step at least approximately by the same distance, such as by the length of the friction cylinder 34 for instance. For an easy determination of the ram energy it may, under certain circumstances, be convenient to determine the number of blows of the ram block per advance step by means of a counter not shown. For advancing the probe stem 11 the coupling 42 is loosened from the probe stem 11. After having completed an advance step, the coupling 42 is again being connected with the probe stem 11 and pressure is given to the underside of the piston 36 of cylinder 10 and thereby the probe stem 11 with the friction cylinder 34 is slightly lifted, such as by three centimeters for instance. The force may be measured by any conventional dynamometer means well known in the art, such as by measuring the fluid pressure occurring in the cylinder 10 which may be read on a pressure gauge not shown. This fluid pressure, after having taken into consideration the inner frictional resistance of the press and the weights suspended on the probe, provides a measure for the skin friction in the just traversed advance step of the soil. Afterwards, either the probe may be driven for the desired pulling back distance by means of the piston 36, for instance, or the coupling 42 may be loosened and the next ramming step may at once taken place and the skin friction for this second step may be determined in the above-described manner. This procedure is repeated until the probe stem 11 has been advanced to the desired depth. From the above it will be understood that by the described method the skin friction per advance step can be determined directly, that is, without reckoning differences. The friction cylinder 34 offers the further advantage of allowing the specific skin friction to be calculated without ado.

A modified device may also be used, by which the friction cylinder after each advance step is not pulled back, but rotated, while the skin friction is determined in a well-known manner by torque measurement. In this way, too, the skin friction per advance step can be obtained directly without reckoning differences.

For carrying out the probe method statically, that is by continuously applying a force to the probe over a certain distance and not by sudden blows, the press may be operated in the reverse sense than with ramming, and the probe stem 11 is connected with the piston 36 also during the downward stroke of the latter. This may for instance be done by means of the device shown in Fig. 10. Here, the tube 41 of cylinder 10, shown in Fig. 4, has a thread 60 onto which a coupling flange 61 is screwed. The coupling 62 corresponding to the coupling 42 and being detachably fixed to the probe stem 11 has two drivers 63 arranged to engage the lower end face of the flange 61.

If the probe stem 11 is to be advanced towards the bottom in Fig. 10, the pressure medium in the press is controlled to urge the piston 36 in Fig. 4 and with it the flange 61 in Fig. 10 towards the bottom. Flange 61 takes the probe stem 11 along towards the bottom by means of the drivers 63. For withdrawing the probe stem 11, pressure is applied to the piston 36 from the bottom in Fig. 4. After a certain time, the end face 64 of the flange 61 strikes against the face 65 of the coupling 62 and moves the latter and the probe stem 11 towards the top.

Figs. 5 to 9 illustrate a device in which the cantilever 13 and the ram block 14 with its drive and releasing mechanism are no longer necessary. Here, the advance of the probe is obtained by a ram cylinder 78 operated by a pressure medium, such as compressed air, for instance, while pulling the probe stem 11 back is carried out by means of the cylinder 10 as in the former example. On withdrawal, the member 73 serves the same purpose as the coupling 42 in Fig. 3.

The plate 66 is adjustable to horizontal position by means of spindles 68 articulated to the base 67 and engaged by screw nuts 69 articulated to the plate 66. The plate 66 carries the cylinder 10 (shown in Fig. 4) and three rods 71 held in position by tubular rings 70. The piece 72 fixed to the upper ends of the rods 71 serves as a guide for the probe stem 11. The ram head 73 is releasably fixed to the probe stem 11 by means of screws 74. A tube 75 fixed to the ram head 73 carries a piston 76 with piston rings 77. The piston 76 lies in the ram cylinder 78 movable along the tube 75 and sealed against the latter by means of packings 79. The cylinder 78 has an upper and a lower control part 80 and 81 respectively. These parts serve alternately as an inlet and an outlet for the pressure medium (air, gas, liquid). The control parts 80, 81 are connected by means of flexible conduits (hoses) 82 and 83 respectively with a control valve illustrated in cross section in Figs. 7 and 8 with its plug 84 in two different positions. The conduits 82 and 83 are connected to bores 85 and 86 of a valve casing 87. A bore 88 of the valve casing 87 is connected to a conduit 89 coming from a pressure medium dispenser (air compressor, for instance). A bore 90 serves the exhaust of the pressure medium. The valve plug 84 has three control bores 91, 92, 93 parallel to one another and a control bore 94 shown in dotted lines in Figs. 7 and 8.

The device according to Figs. 5 to 9 works as follows: When the probe stem 11 is to be further advanced downwards out of the position of Fig. 5, the valve plug 84 is turned into the position of Fig. 8 either by hand or in any other suitable way. In the position of Fig. 8, the pressure medium flows from the conduit 89 through the bore 84 and dotted bores 95 of the casing 87 into the conduit 82 and through the part 80 into the cylinder space lying above the piston 76. The lower cylinder space is connected with the outside air through the conduit 83 and the bores 92 and 90. The pressure medium entering through the part 80 lifts the cylinder 78 until its lower inner end face rests on the piston 76 while provision is made to prevent the cylinder 78 from executing a blowing action onto the piston 76. Afterwards, the plug 84 is turned into the position of Fig. 7 either by hand or in any other suitable manner. The upper cylinder space is now connected with the outside air through the conduit 82 and the bores 85, 91 and 90, while the pressure medium flows into the lower cylinder space through a conduit 98, the bores 88, 93, 86 and the conduit 83, and throws the cylinder 78 towards the bottom onto the ram head 73, thereby advancing the probe stem 11. This procedure is repeated (by operating the valve plug 84) in the same manner as described in the former example with regard to the ram block 14. Means may be provided to change the blowing force of the cylinder 78 by modifying the pressure of the medium. Undesired backward movements of the probe may for instance be avoided by providing a ratchet device well-known to those skilled in the art. Pulling back the probe takes place by means of the cylinder 10 in the same manner as described with regard to the former example.

Instead of controlling the ram cylinder 78 by means of the valve shown in Figs. 7 and 8, this control may also be automatically executed by the piston 76 itself, which, in this case, must of course be modified accordingly.

The device shown in Figs. 5 to 9 may be portable in the same way as shown in the former example or in any other manner.

If on probing a thixotropic liquid is used between the probe stem 11 and the wall of the hole to be pierced, the piston 36 may also be operated by this thixotropic liquid instead of using another pressure medium such as water or oil for instance.

Instead of the means shown and described in this specification for advancing the probe, other means such as an explosion ram may for instance be used, while care will preferably have to be taken to choose such means which allow an exact determination of the energy.

According to the nature of the soil to be examined it may happen that on advancing and withdrawing or rotating the probe the soil material falls in behind the friction cylinder and comes into contact with the probe stem so that also the skin friction of the probe stem would be measured and the result of the test would thereby be adulterated.

This danger can be done away with by determining the skin friction of the probe stem by moving the latter alone and by determining the sum of the skin frictions of the probe stem and the friction cylinder by simultaneously moving the stem and the cylinder. To carry out the method in this manner a probe is used in which the friction cylinder is movably arranged on the probe stem. Such a means is shown in Figs. 11 and 12.

Figure 11:
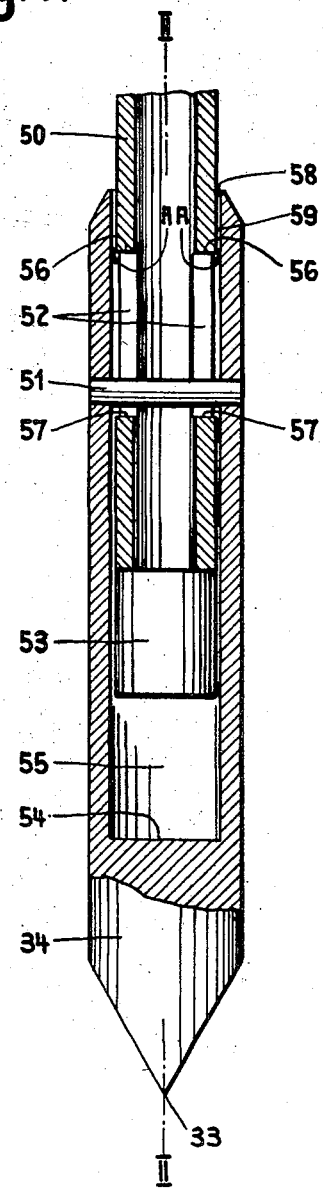
Fig. 11 is an axial section through a probe comprising a friction cylinder which is axially movable along the probe stem.
Figure 12:
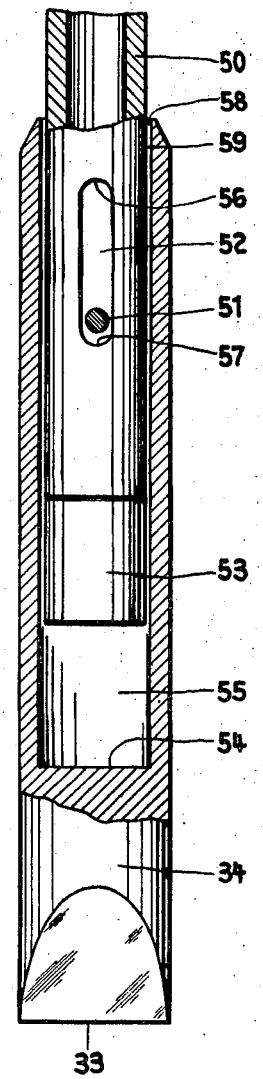
Fig. 12 is a partial section along the line XII—XII in Fig. 11.

In Figs. 11 and 12 the hollow friction cylinder 34 with the tip 33 is mounted axially movably on the tubular probe stem 50. A drive pin 51 fixed to the cylinder 34 traverses slots 52 of the stem 50. Stem 50 and cylinder 34 are therefore connected with each other by a lag coupling. The slots 52 are long enough to allow the stem shoe 53 on the advance of the probe to rest on the bottom 54 of the bore 55 of the cylinder 34 without the upper edges 56 of the slots 52 coming into contact with the pin 51. In a modification the pin 51 may be fixed to the stem 50 and engage grooves of the cylinder 34.

On carrying out the method by means of the device according to Figs. 11 and 12, the probe may be advanced in the same way as in the former examples. Afterwards, however, only the stem 50 alone is withdrawn with the help of the same or other means as in the other examples, while the friction cylinder 34 remains at rest for the time being. The skin friction $M_s$ occurring on this withdrawal is only the friction of the stem 50 alone. It may as in the former examples for instance be determined by reading the pressure in the press on a pressure gauge. After a certain pulling back distance the lower slot edges 57 of the stem 50 strike against the drive pin 51 and on further withdrawal of the stem 50 the friction cylinder 34 is carried along by the pin 51. The skin friction occurring on this common withdrawal of the parts 50 and 34 is the sum $M_{s+z}$ of the skin frictions of stem 50 and cylinder 34. It may be determined in the same way as the friction $M_s$ alone, i. e. for instance by reading the pressure in the press on the pressure gauge. The skin friction $M_z$ of the friction cylinder 34 alone is afterwards simply obtained as the difference $M_{s+z} - M_s$. In this way, any adulteration of the measurement of the skin friction of the cylinder 34 is avoided.

In the just explained example, at first the probe stem 50 is withdrawn alone. One may, however, also proceed in the reverse sense and withdraw at first probe stem and friction cylinder together and afterwards the stem alone. For this purpose, however, on the advance and the common withdrawal of stem and cylinder, the pin 51 would have to be held at the upper end of the slots 52 by means of a disengaging coupling, such as a well-known ratchet device for instance.

In another embodiment, the friction cylinder may be rotatable or rotatable and axially displaceable with regard to the stem. In the case of rotary movement a ball coupling well-known to experts may be provided between the stem and the cylinder, allowing relative rotation between stem and cylinder in one direction of rotation and transmitting the rotation of the stem to the cylinder in the other direction of rotation. The same effect would be obtained by substituting a ratchet device for the ball coupling.

In order to flush out soil material entering the intermediate space 59 between stem 50 and cylinder 34 through the annular opening 58, a scavenging means such as water, compressed air or fluid mud, for instance, may be passed through the stem and the slots 52 from the top in the direction of the arrows A. In order to drive out obstructions in the intermediate space 59 below the slots 52, the shoe 53 may be pierced and the scavenging means may be passed through this bore in the shoe to the underside of the shoe, wherefrom it flows towards the top along the whole length of the intermediate space 59 and drives out the obstructions. However, the annular space 59 may also be sealed by means of a packing or of grease, for instance.

For executing the method by means of the probe of Figs. 11 and 12, the remaining means of the former examples may be used.

With the probe of Figs. 11 and 12, too, the method may be carried out by ramming or statically, as in the other examples.

Probing according to the invention may be executed in any direction desired.

While I have described and shown several forms of performance, I do not wish to unnecessarily limit the scope of my invention thereto, but reserve the right to make such modifications as may come within the purview of the following claims.

What I claim is:

1. An apparatus for the step-by-step determination of the skin resistance of a series of soil layers comprising a probe cylinder to be advanced into the soil, a stem of smaller diameter than said cylinder, means to drive the stem and cylinder into a soil layer, lost motion coupling means operatively connecting the stem and the probe cylinder to allow movement of the stem alone in other than in the advance direction and to allow movement of the stem together with the probe cylinder in other than in the advance direction, and dynamometer means operatively connected to said stem to measure forces applied thereto in other than the advance direction, whereby the difference in the force required to move the stem alone and to move the stem and the cylinder together determines the skin resistance of the soil layer adjacent the cylinder.

2. An apparatus for the step-by-step determination of the skin resistance of a series of soil layers comprising a probe cylinder to be advanced into the soil, a stem of smaller diameter than said cylinder, means to drive the stem and cylinder into a soil layer, lost motion slot and pin coupling means operatively connecting the stem and the probe cylinder to allow movement of the stem alone in other than in the advance direction and to allow movement of the stem together with the probe cylinder in other than in the advance direction, and dynamometer means operatively connected to said stem to measure forces applied thereto in other than the advance direction, whereby the difference in the force required to move the stem alone and to move the stem and the cylinder together determines the skin resistance of the soil layer adjacent the cylinder.

3. An apparatus for the step-by-step determination of the skin resistance of a series of soil layers comprising a probe cylinder to be advanced into the soil, a stem of smaller diameter than said cylinder, means to drive the stem and cylinder into a soil layer, lost motion coupling means operatively connecting the stem and the probe cylinder to allow movement of the stem alone in other than in the advance direction and to allow movement of the stem together with the probe cylinder in other than in the advance direction, dynamometer means operatively connected to said stem to measure forces applied thereto in other than the advance direction, the lost motion coupling means including means on the probe cylinder providing a pair of oppositely positioned slots adjacent one end thereof, the stem being adapted to be received in the slotted end of the probe cylinder, and a coupling pin extending from the stem and engaging in the slots permitting limited relative movement between the stem and the probe cylinder, whereby the difference in the force required to move the stem alone and to move the stem and the cylinder together determines the skin resistance of the soil layer adjacent the cylinder.

4. An apparatus for the step-by-step determination of the skin resistance of a series of soil layers comprising a probe cylinder to be advanced into the soil, a stem of smaller diameter than said cylinder, means to drive the stem and cylinder into a soil layer, lost motion coupling means operatively connecting the stem and the probe cylinder to allow movement of the stem alone in other than in the advance direction and to allow movement of the stem together with the probe cylinder in other than in the advance direction, dynamometer means operatively connected to said stem to measure forces applied thereto in other than the advance direction, the lost motion coupling means including means on the probe cylinder providing a pair of oppositely positioned slots adjacent one end thereof, the stem being adapted to be received in the slotted end of the probe cylinder, and a coupling pin extending from the stem and engaging in the slots permitting limited relative movement between the stem and the probe cylinder, the probe cylinder having a closed end, the slots and coupling pin being of dimensions and so positioned that upon an inward movement of the stem its end contacts the closed end of the probe cylinder, whereby the difference in the force required to move the stem alone and to move the stem and the cylinder together determines the skin resistance of the soil layer adjacent the cylinder.

5. An apparatus for the step-by-step determination of the skin resistance of a series of soil layers comprising a probe cylinder to be advanced into the soil, a stem of smaller diameter than said cylinder, means to drive the stem and cylinder into a soil layer, lost motion coupling means operatively connecting the stem and the probe cylinder to allow movement of the stem alone in other than in the advance direction and to allow movement of the stem together with the probe cylinder in other than in the advance direction, dynamometer means operatively connected to said stem to measure forces applied thereto in other than the advance direction, the lost motion coupling means including means on the probe cylinder providing a pair of oppositely positioned slots adjacent one end thereof, the stem being adapted to be received in the slotted end of the probe cylinder, and a coupling pin extending from the stem and engaging in the slots permitting limited relative movement between the stem and the probe cylinder, the stem hollow providing a fluid passage therethrough and outwardly through the slots for scavenging between the stem and the probe cylinder, whereby the difference in the force required to move the stem alone and to move the stem and the cylinder together determines the skin resistance of the soil layer adjacent the cylinder.

References Cited in the file of this patent

UNITED STATES PATENTS

| 2,280,592 | Le Mieux | Apr. 21, 1942 |
| 2,472,120 | Murphy | June 7, 1949 |

FOREIGN PATENTS

| 508,711 | Germany | Oct. 1, 1930 |
| 43,095 | Netherlands | May 16, 1938 |
| 504,625 | Great Britain | Apr. 27, 1939 |
| 974,680 | France | Oct. 4, 1950 |
| 985,203 | France | Mar. 7, 1951 |
| 993,278 | France | July 18, 1951 |